(12) United States Patent
Coldren et al.

(10) Patent No.: US 11,008,957 B2
(45) Date of Patent: May 18, 2021

(54) SPILL VALVE ASSEMBLY FOR IMPROVED MINIMUM DELIVERY CAPABILITY IN FUEL SYSTEM

(71) Applicant: Caterpillar Inc., Deerfield, IL (US)

(72) Inventors: Dana Coldren, Secor, IL (US); Sana Mahmood, Albuquerque, NM (US)

(73) Assignee: Caterpillar Inc., Peoria, IL (US)

( * ) Notice: Subject to any disclaimer, the term of this patent is extended or adjusted under 35 U.S.C. 154(b) by 197 days.

(21) Appl. No.: 16/432,537

(22) Filed: Jun. 5, 2019

(65) Prior Publication Data

US 2020/0386171 A1 Dec. 10, 2020

(51) Int. Cl.
| | | |
|---|---|---|
| *F02D 19/02* | (2006.01) | |
| *F02M 59/46* | (2006.01) | |
| *F02M 45/06* | (2006.01) | |
| *F02M 61/16* | (2006.01) | |
| *F02M 59/26* | (2006.01) | |

(52) U.S. Cl.
CPC ......... *F02D 19/024* (2013.01); *F02M 45/066* (2013.01); *F02M 59/265* (2013.01); *F02M 59/466* (2013.01); *F02M 61/16* (2013.01)

(58) Field of Classification Search
CPC .. F02D 19/024; F02D 41/406; F02D 19/0642; F02D 19/061; F02M 59/466; F02M 45/066; F02M 61/16; F02M 59/265
USPC ....................................................... 701/103
See application file for complete search history.

(56) References Cited

U.S. PATENT DOCUMENTS

| 5,333,588 A | * 8/1994 | Cananagh | F02M 45/06 |
|---|---|---|---|
| | | | 123/500 |
| 6,067,964 A | 5/2000 | Ruoff et al. | |
| 6,173,699 B1 | 1/2001 | Kasen | |
| 6,378,503 B1 | 4/2002 | Lambert | |
| 6,601,566 B2 | 8/2003 | Gillis et al. | |
| 7,747,378 B2 | 6/2010 | Shiraishi et al. | |
| 8,973,554 B2 | 3/2015 | Park et al. | |
| 2005/0287021 A1* | 12/2005 | Ferleyko | F04B 49/24 |
| | | | 417/417 |
| 2010/0012092 A1 | 1/2010 | Gutonagane et al. | |
| 2015/0369160 A1* | 12/2015 | Tanis | F02M 63/0015 |
| | | | 239/5 |

FOREIGN PATENT DOCUMENTS

EP 2650522 B1 6/2016

* cited by examiner

*Primary Examiner* — Joseph J Dallo
*Assistant Examiner* — Scott A Reinbold
(74) *Attorney, Agent, or Firm* — Brannon Sowers & Cracraft

(57) ABSTRACT

A fuel system for an internal combustion engine includes a nozzle, a fuel pump, a spill valve assembly, and a pumping control unit. The spill valve assembly includes a first spill valve and a second spill valve fluidly in parallel between a plunger cavity in the fuel pump and a low pressure space. A pumping control unit commands closing of the first spill valve and then the second spill valve to adjust the spill valve assembly to start pressurization in the fuel pump, and commands opening the first spill valve to end pressurization in the fuel pump. A pumping duration is determined based on a timing of the commanded closing of the second spill valve and a timing of the commanded opening of the first spill valve.

20 Claims, 5 Drawing Sheets

SPILL VALVE ASSEMBLY FOR IMPROVED MINIMUM DELIVERY CAPABILITY IN FUEL SYSTEM

TECHNICAL FIELD

The present disclosure relates generally to a fuel system for an internal combustion engine, and more particularly to dual spill valves in a fuel system for improved control over pump delivery amounts.

BACKGROUND

Fuel systems in internal combustion engines, notably compression ignition engines, can be one of the most complex parts of the machinery. In a typical diesel compression ignition configuration, a plurality of fuel injectors are associated one with each of a plurality of cylinders. Fuel is supplied to each of the individual fuel injectors, and nozzle outlet checks actuated to controllably spray a metered quantity of fuel into the corresponding cylinder. Such fuel injectors commonly have a number of rapidly moving internal components related to valve actuation and fuel pressurization. These internal components are often machined to tight tolerances and subjected to harsh operating conditions.

Individual fuel injector components, and those in related subsystems such as fuel pumps, may be optimized for operation under a relatively narrow set of conditions, and as a result may perform less than optimally outside of the window of conditions for which they are optimized. For example, certain valves can be sized, actuated, controlled or otherwise adapted for best performance in only one part of a range of fluid flow rates or amounts through the valve. When the valve is used outside of that operating range, performance can be limited.

Some fuel systems utilize a so-called spill valve to control pumping duration of a plunger in or associated with a fuel injector, or in a pump supplying fuel to a common pressure reservoir. In general, the plunger is allowed to more or less passively reciprocate, drawing fuel in and discharging fuel out through a spill passage without increasing a pressure of the fuel. When the spill passage is closed, spilling of the fuel becomes unavailable, and instead advancing of the plunger pressurizes the fuel for injection or delivery to a fuel reservoir. A spill valve optimized for operation at one end of a range of flow rates or amounts may not perform as well at the other end of that range, for example. U.S. Pat. No. 6,173,699 to Kasen sets forth one example fuel system utilizing a spill valve.

SUMMARY OF THE INVENTION

In one aspect, a fuel system for an internal combustion engine includes a fuel injection nozzle, and a fuel pump including a plunger coupled to a tappet and structured to pressurize a fuel for injection into the internal combustion engine through the fuel injection nozzle. The fuel pump defines a low pressure space, a high pressure outlet, and a plunger cavity receiving the plunger and fluidly connected to the high pressure outlet. The fuel system further includes a spill valve assembly having a first spill valve and a second spill valve fluidly in parallel with one another between the plunger cavity and the low pressure space. Each of the first spill valve and the second spill valve is movable between an open position where the plunger cavity is fluidly connected to the low pressure space, and a closed position. The fuel system further includes a pumping control unit in control communication with the first spill valve and the second spill valve. The pumping control unit is structured to command closing of the first spill valve, and command closing of the second spill valve after the closing of the first spill valve to adjust the spill valve assembly to a start-of-pressurization configuration. The pumping control unit is further structured to command opening of the first spill valve while the second spill valve remains closed to adjust the spill valve assembly from the start-of-pressurization configuration to a start of spill configuration. The pumping control unit is still further structured to determine a pumping duration of the fuel pump based on a timing of the commanded closing of the second spill valve and a timing of the commanded opening of the first spill valve.

In another aspect, a fuel system for an internal combustion engine includes a fuel supply, a plurality of fuel injection nozzles, a cam, and a fuel pump. The fuel pump includes a plunger coupled to a tappet in contact with the cam and structured to pressurize a fuel for injection into the internal combustion engine through at least one of the plurality of fuel injection nozzles. The fuel pump defines a low pressure space, a high pressure outlet, and a plunger cavity receiving the plunger and fluidly connected to the high pressure outlet. The fuel system further includes a spill valve assembly having a first spill valve and a second spill valve arranged fluidly in parallel with one another between the plunger cavity and the low pressure space. The spill valve assembly has a first configuration where each of the first spill valve and the second spill valve is open, and is adjustable to a start-of-pressurization configuration where each of the first spill and the second spill valve is closed, and to a start of spill configuration where the first spill valve is open and the second spill valve remains closed.

In still another aspect, a method of operating a fuel system for an internal combustion engine includes spilling fuel from a plunger cavity in a fuel pump through each of a first spill valve and a second spill valve in a spill valve assembly to a low pressure space, during moving a plunger in the fuel pump between a retracted position and an advanced position. The method further includes closing the first spill valve in the spill valve assembly, and closing a second spill valve in the spill valve assembly after the closing of the first spill valve to start pressurization of fuel within the plunger cavity. The method further includes conveying pressurized fuel from the plunger cavity to a high pressure outlet of the fuel pump, and opening the first spill valve while the second spill valve remains closed to end pressurization of fuel within the plunger cavity at a timing determining a pumping duration of the fuel pump. The method still further includes feeding the pressurized fuel from the high pressure outlet to a nozzle supply passage in a fuel injection nozzle.

DETAILED DESCRIPTION

Figure 1:
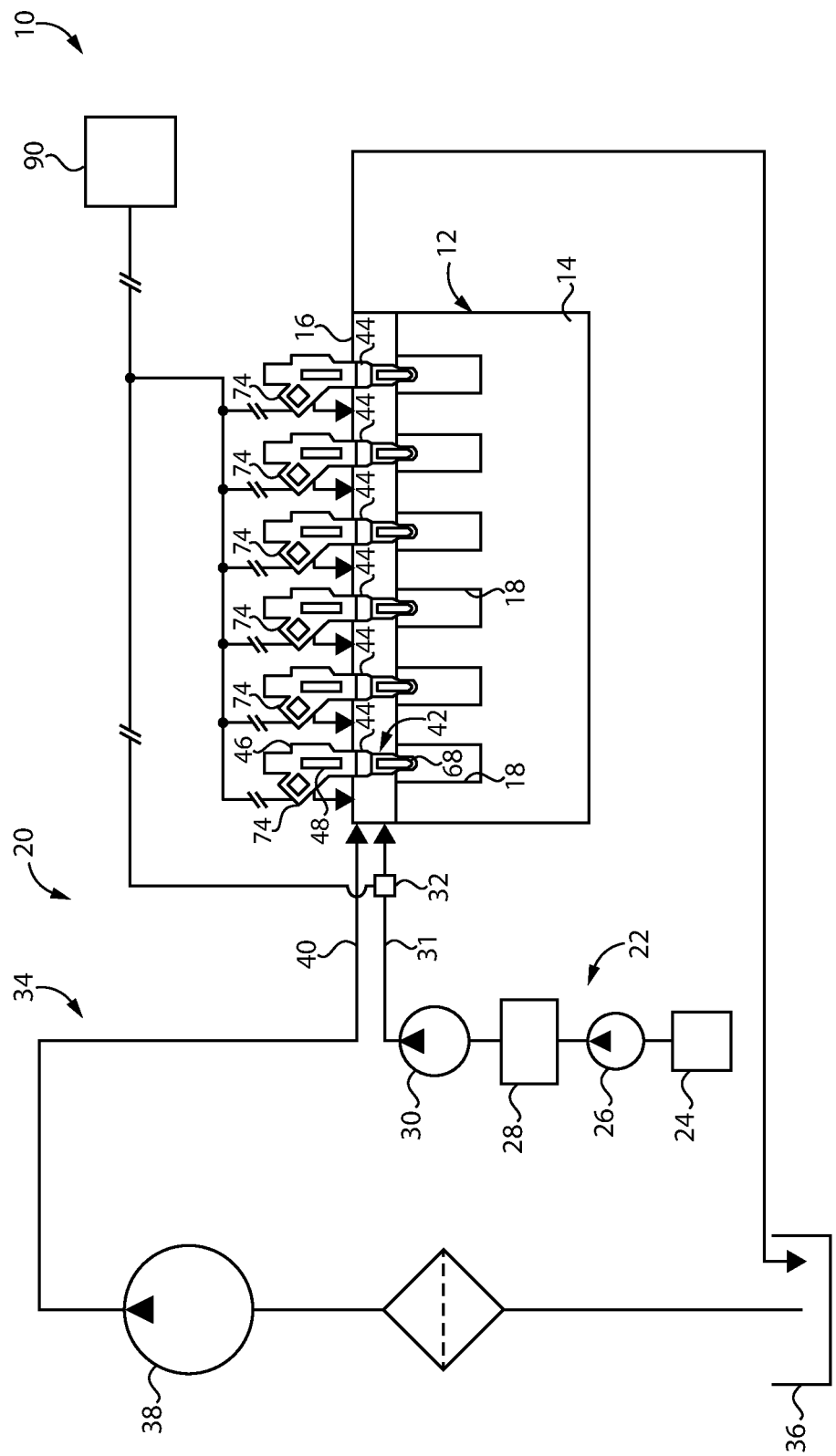
FIG. 1 is a side diagrammatic view of an internal combustion engine system, according to one embodiment.

Referring to FIG. 1, there is shown an internal combustion engine system 10, according to one embodiment. Internal combustion engine system 10 (hereinafter "engine system 10") includes an engine 12 having an engine housing 14 with a plurality of cylinders 18 formed therein. Cylinders 18 can include any number in any suitable arrangement. An engine head 16 is coupled to engine housing 14 in a generally conventional manner. Engine system 10 may include a compression ignition diesel engine capable of operation on liquid diesel distillate fuel, or another suitable compression ignition fuel. Engine system 10 may further be structured as a dual fuel engine system structured to operate on a liquid fuel such as a diesel distillate fuel as well as a gaseous fuel. A gaseous fuel such as methane, ethane, landfill gas, biogas, or others is a fuel that is gaseous at standard temperature and pressure. To this end, engine system 10 includes a fuel system 20 having a liquid fuel subsystem 34 and a gaseous fuel subsystem 22. Gaseous fuel subsystem 22 includes a gaseous fuel supply 24, which may store a gaseous fuel in a cryogenically liquified state. Gaseous fuel subsystem 22 may also include a pump 26 and equipment for vaporizing and pressurizing gaseous fuel for delivery to engine 12. In other embodiments, rather than using a pump to manage gaseous fuel pressure, a tank pressure management system employing a vaporizer without a pump could be used. A vaporizer 28 may be fluidly connected to a pump 26 that pumps gaseous fuel in the liquid state from gaseous fuel supply 24. A second pump 30 receives gaseous fuel, now in a gaseous state, from vaporizer 28 and supplies it to a gas conduit 31 extending to engine 12. Gas conduit 31 could include a gas conduit that delivers the gaseous fuel to a plurality of injectors within engine head 16, to an intake manifold, to intake runners extending from an intake manifold to engine head 16, or potentially to a delivery location upstream of a compressor in a turbocharger. In a practical implementation strategy, gaseous fuel subsystem 22 includes at least one gaseous fuel admission valve 32 structured to admit a metered amount of gaseous fuel for combustion in engine 12. A dual fuel application is a practical implementation strategy, however, as noted above engine system 10 could be a single fuel system in some embodiments.

Liquid fuel subsystem 34 includes a liquid fuel supply or tank 36, and a fuel transfer pump 38 structured to convey liquid fuel from tank 36 to a liquid fuel supply conduit 40. Liquid fuel supply conduit 40 feeds liquid fuel at low pressure into engine head 16 for delivery to a plurality of fuel injectors 44 each positioned to extend at least partially into one of cylinders 18. In other embodiments, discussed below, one or more pressurized fuel reservoirs might be fed by a high pressure pump, and provide fuel at a pressure suitable for injection to fuel injection nozzles of a plurality of fuel injectors. In the illustrated embodiment, liquid fuel is pressurized independently for, or within, each one of fuel injectors 44. Each of fuel injectors 44 includes a fuel injection nozzle 42 extending into the corresponding one of cylinders 18. Each of fuel injectors 44 also includes a fuel pump 46 including a plunger 48. Each of fuel injectors 44 also includes or is coupled with a spill valve assembly 74, details of which are further discussed herein. A pumping control unit 90 is in control communication with each of spill valve assemblies 74. Pumping control unit 90 can include any suitable computer control unit having a central processing unit or CPU and computer memory storing computer-executable program instructions. Pumping control unit 90 can include or be an engine control unit, or one or more control units separate from an engine control unit structured to control spill valve assemblies 74 to determine a pumping duration of the corresponding fuel pump 46. It has been discovered that spill valve assemblies structured and arranged according to the present disclosure can assist in achieving relatively precise control of small injections of liquid fuel used, for example, in high substitution rate dual fuel applications, for reasons which will be further apparent from the following description.

Figure 2:
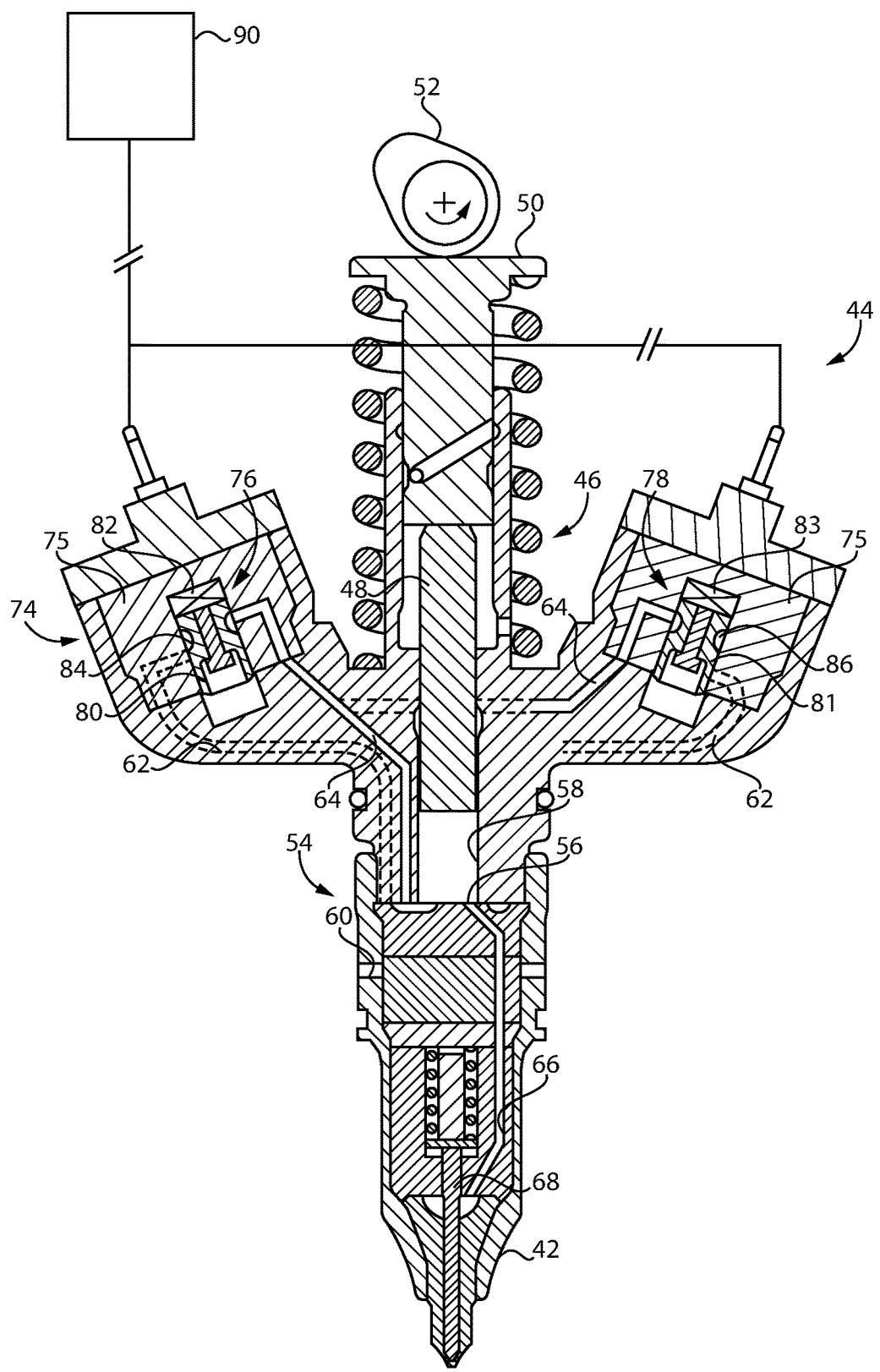
FIG. 2 is a sectioned side diagrammatic view of a fuel injector, according to one embodiment.

Referring now also to FIG. 2, there are shown additional features of one fuel injector 44 in further detail. Fuel injectors 44 may be interchangeable with one another in engine system 10 and, accordingly, discussion herein of features or functionality of fuel injector 44 in the singular should be understood by way of analogy to refer any other fuel injectors in engine system 10. Moreover, description of features or functionality of any one embodiment should be understood to refer by way of analogy to features or functionality of any other embodiment except where otherwise stated or apparent from the context. Fuel injector 44 includes fuel pump 46 and fuel injection nozzle 42. As noted above, fuel pump 46 includes plunger 48. Plunger 48 is coupled to a tappet 50 in contact with a cam 52 of engine system 10, typically rotated at one-half engine speed. Rotation of cam 52 moves plunger 48 between a retracted position and an advanced position to pressurize a fuel for injection into engine 12 through fuel injection nozzle 42. In other embodiments, rather than mechanical actuation fuel pump 46 could be hydraulically actuated. Fuel pump 46 further defines a low pressure space 54, a high pressure outlet 56, and a plunger cavity 58 receiving plunger 48 and fluidly connected to high pressure outlet 56. Low pressure space 54 can be, or include, or be fluidly connected to fuel supply conduit 40. Alternatively, low pressure space 54 could be a separate low pressure drain. Fuel injector 44 and fuel pump 46 further define an inlet 60 which may be fluidly connected to low pressure space 54 and/or fuel supply conduit 40, and an inlet passage 62 extending from low pressure inlet 60. A nozzle check 68 is positioned in fuel injector 44 and fuel injection nozzle 42 and movable between an open position and a closed position to control injection of fuel into a corresponding one of cylinders 18. A pressure of fuel supplied by way of nozzle supply passage 66 can act on opening hydraulic surfaces of nozzle check 68 in a generally known manner. Nozzle supply passage 66 may directly fluidly connect and transition with high pressure outlet 56 of fuel pump 46.

Also shown in FIG. 2 are additional features of spill valve assembly 74 including at least one housing 75, a first spill valve 76 and a second spill valve 78. A first electrical actuator 82 is coupled with a first spill valve member 80 and a second electrical actuator 83 is coupled with a second spill valve member 81 of first spill valve 76 and second spill valve 78, respectively. A plunger passage 64 extends between spill valve assembly 74 and plunger cavity 58, and can branch to separately fluidly connect to each of the spill valves 76 and 78. First spill valve member 80 has a first annulus 84 formed therein and second spill valve member 81 has a second annulus 86 formed therein. Each of first spill valve member 80 and second spill valve member 81 is movable between a first position fluidly connecting inlet passage 62 to plunger passage 64, and a second position at which inlet passage 62 is blocked from plunger passage 64.

First spill valve 76 and second spill valve 78 are fluidly in parallel with one another between plunger cavity 58 and low pressure space 54. Each of first spill valve 76 and second spill valve 78 is thus movable between the first or open position where plunger cavity 58 is fluidly connected to low pressure space 54, and the second or closed position. It will be appreciated that based on the parallel fluid connections that when either of first spill valve 76 or second spill valve 78 is open inlet passage 62 is fluidly connected to plunger passage 64 and movement of plunger 48 between its advanced position and its retracted position draws fuel into plunger cavity 58 and discharges fuel from plunger cavity 58 by way of inlet 60. When each of first spill valve 76 and second spill valve 78 is closed movement of plunger 48 towards its advanced position in plunger cavity 58 pressurizes fuel and advances the pressurized fuel to high pressure outlet 56, and thenceforth to nozzle supply passage 66 for injection.

Pumping control unit 90 is in control communication with first spill valve 76 and second spill valve 78 and structured to change an electrical energy state of electrical actuator 82 and electrical actuator 83 to move first spill valve 76 and second spill valve 78 open or closed. Varying in electrical energy state of electrical actuators 82 and 83 can include energizing electrical actuators 82 and 83 by way of a first control current and a second control current, respectively. In one operational application, pumping control unit 90 can command closing of first spill valve 76 while second spill valve 78 is open, and then command closing of second spill valve 78 after closing of first spill valve 76 to adjust spill valve assembly 74 to a start-of-pressurization configuration. Pumping control unit 90 may then command opening of first spill valve 76 while second spill valve 78 remains closed to adjust spill valve assembly 74 from the start-of-pressurization configuration to a start-of-spill configuration. Closing and opening first and second spill valves 76 and 78 in this general manner enables pumping control unit 90 to determine a pumping duration of fuel pump 46 based on a timing of the commanded closing of second spill valve 78 and a timing of the commanded opening of first spill valve 76. Another way to understand these principles is that pumping control unit 90 is using second spill valve 78 to block fluid connection between plunger cavity 58 and inlet 60 to start pressurization, and then using first spill valve 76 to establish fluid connection between plunger cavity 58 and inlet 60. Each of spill valves 76 and 78 will typically have a flow area sufficient to handle a full outflow of pumped fuel from plunger cavity 58, enabling either of spill valves 76 or 78 to rapidly and precisely cut off pressurization of fuel by plunger 48 as well as permitting plunger 48 to displace fuel without pressurization while open. No limitation by way of the terms "first" and "second" is intended herein, and in most application either of spill valves 76 or 78 could be actuated first or second.

Those skilled in the art will appreciate that high speed electrically actuated valves such as those used in spill valve assembly 74 can be limited as to the precision or accuracy with which they can be manipulated, based on the selected conditions for which the valves are optimized. In a dual fuel application, for instance, it is typically desirable to design a valve such that it can accommodate full diesel operation over at least part of, and often an upper end of, an engine load range. Accordingly, flow volumes and flow rates can dictate that a spill valve in a conventional system has some minimum size and/or capacity. It can nevertheless be desirable, such as when operating at high substitution ratios of gaseous fuel for liquid fuel, to be able to precisely inject very small amounts of liquid fuel to produce pilot charges of liquid fuel for igniting a main charge of gaseous fuel. Such an application may thus necessitate moving a spill valve optimized to handle full diesel operation very fast, and/or reversing travel direction in very short time intervals. In at least some instances, such spill valves in known designs would need to be returned from a closed position to an open position prior to the spill valve having time to settle at the closed position, in other words stabilize and cease bouncing, for instance. For these and other reasons single spill valve applications can have less than optimal performance in dual fuel applications at high substitution ratios. Analogous issues might be observed in some single fuel designs. By separating start-of-pressurization and start-of-spill functions between multiple valves, challenges relating to controllability of very small liquid fuel injection amounts can be addressed, and the present disclosure provides for relatively large spill capacity with precision and control similar to what might be available with a smaller single spill valve having lower spill capacity.

In the embodiment of FIG. 2, spill valve assembly 74 is arranged in a dual sidecar configuration resident in fuel injector 44. First spill valve 76 and second spill valve 78 are arranged fluidly in parallel with one another between plunger cavity 58 and low pressure inlet 60. It has been discovered that the foregoing challenges and solutions offered by the present disclosure may also be realized in other fuel injector designs, such as where a fuel injector nozzle is separated from a unit pump for that fuel injector nozzle and connected by way of a high pressure capable supply line. It is also contemplated that a pressurized fuel reservoir can be maintained at pressure by a single fuel pump but provide pressurized fuel to a plurality of fuel injection nozzles, with a spill valve assembly according to the present disclosure metering an output of the fuel pump to a pressurized fuel reservoir such as a common rail or the like.

Figure 3:
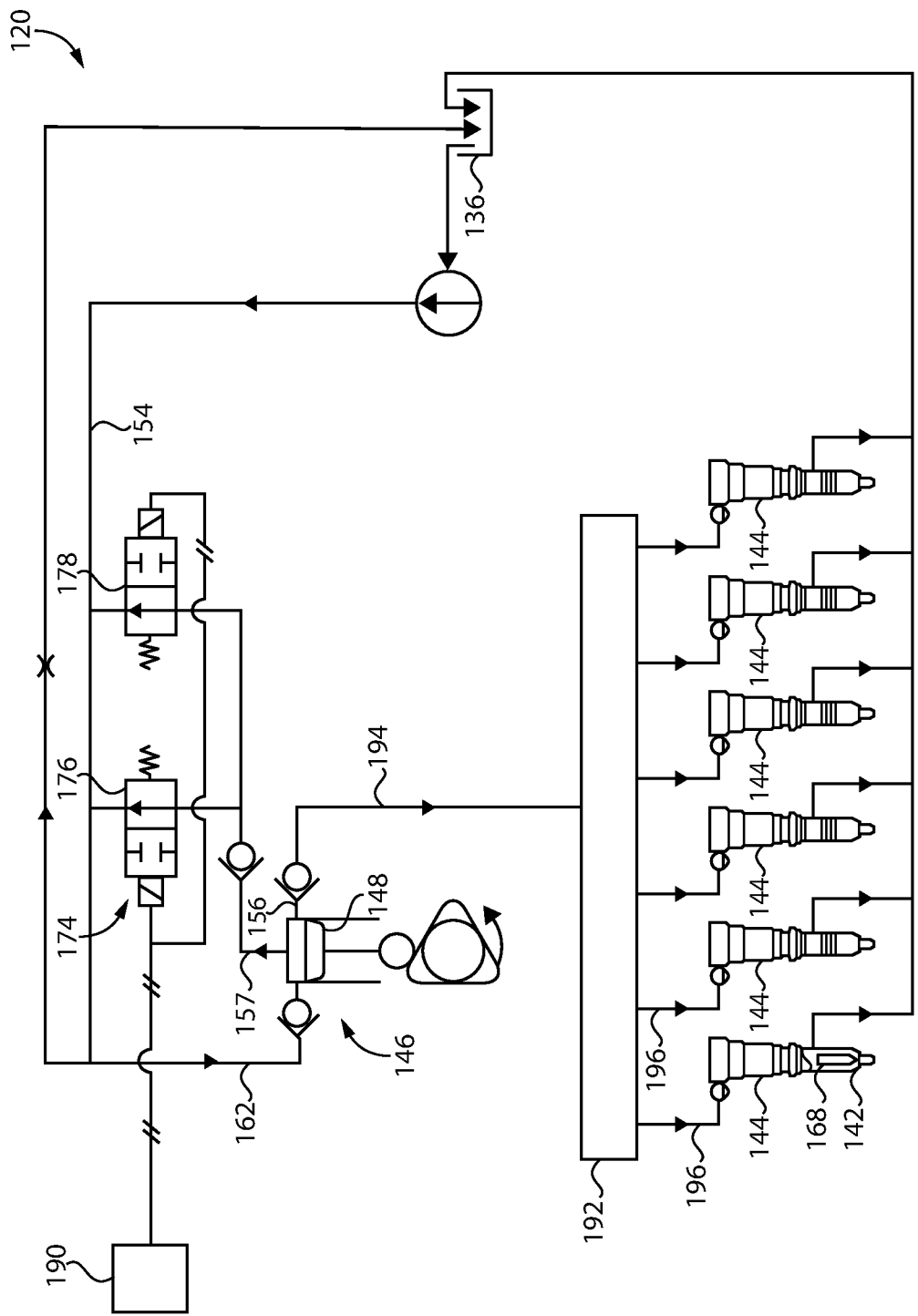
FIG. 3 is a schematic illustration of a fuel system, according to one embodiment.

To this end, and now referring to FIG. 3, there is shown a fuel system 120 according to another embodiment. Fuel system 120 includes a plurality of liquid fuel injectors 144 each having a fuel injection nozzle 142 structured to inject a fuel into one of a plurality of cylinders in an engine. A pressurized fuel reservoir 192 stores pressurized fuel for delivery by way of feed lines 196 to fuel injectors 144. Pressurized fuel reservoir 192 can receive pressurized fuel by way of a feed line 194 from a fuel pump 146. A fuel supply or tank 136 is provided to supply liquid fuel such as diesel distillate fuel, by way of an inlet conduit or inlet passage 162 to fuel pump 146. Fuel system 120 could also be a dual fuel system with gaseous fuel equipment similar to fuel system 20 discussed above. Fuel pump 146 includes a cam-actuated plunger 148 that receives fuel from inlet passage 162 and transitions the fuel to a spill passage 157 or to a high pressure outlet 156 for supplying the fuel to feed line 194. A spill valve assembly 174, similar to spill valve assembly 74 discussed above, is positioned fluidly between plunger 148 and inlet passage 162. In the illustrated embodiment, spill passage 157 spills fuel, based on a present configuration of spill valve assembly 174, back to inlet passage 162. Inlet passage 162 is understood to include or be fluidly connected with a low pressure space in the embodiment of FIG. 3, generally analogous to embodiments discussed above. Pressurized fuel reservoir 192 is fluidly connected to high pressure outlet 156 by way of feed line 194 and located fluidly between fuel pump 146 and fuel injection nozzles of fuel injectors 144. In the embodiment of FIG. 3 the leftmost one of fuel injectors 144 is shown with a fuel injection nozzle 142 and a direct operated nozzle check 168. The other fuel injectors 144 may be similarly configured. Spill valve assembly 174 includes a first spill valve 176 and a second spill valve 178. First and second spill valves 176 and 178 can be understood to be fluidly in parallel with one another between plunger 148 (and its associated plunger cavity) and the low pressure space provided by inlet passage 162, or another low pressure space such as fuel tank 136, or another low pressure drain. In a practical implementation strategy first spill valve 176 and second spill valve 178 could be configured analogously to first and second spill valves 76 and 78 of the foregoing embodiment, and housed together in a common housing or separately.

Figure 4:
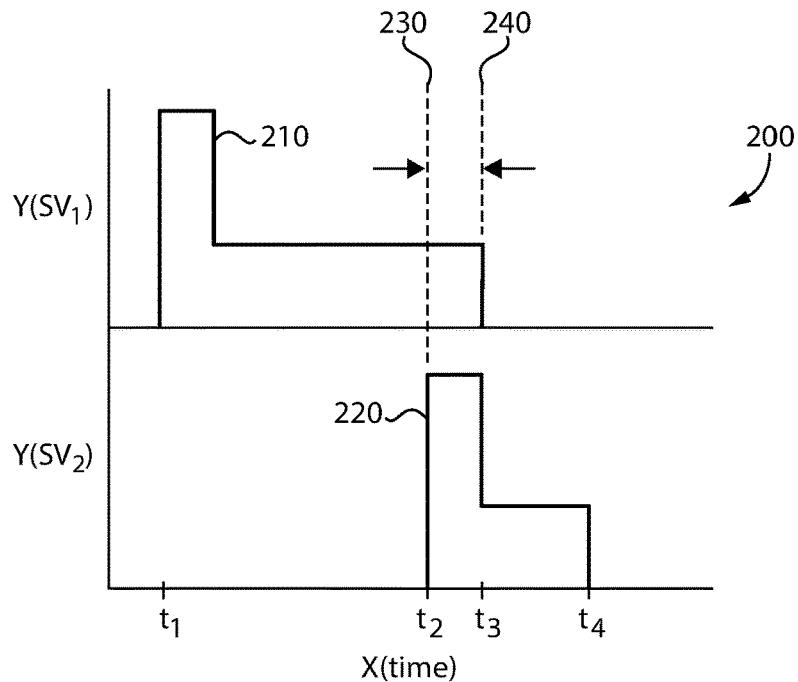
FIG. 4 is an example signal trace for electrical actuator control currents, according to one embodiment.

Referring now to FIG. 4, there is shown a graph 200 illustrating a first control current 210 and a second control current 220 with time shown on the X-axis and signal value shown on adjacent Y-axis for a first spill valve $SV_1$ and a second spill valve $SV_2$. Electrical current events depicted in FIG. 4 will generally approximate physical/hydraulic events in a fuel system according to the present disclosure, although they may not be precisely the same. The illustration of FIG. 4 could be understood to refer by way of analogy to operation of any of the embodiments discussed herein. At a time $t_1$ pumping control unit 90, or a pumping control unit 190 in the FIG. 3 embodiment, commands closing of first spill valve 76 by supplying first control current 210 to first electrical actuator 82. An initial relatively large amplitude of first control current 210 is used to initiate travel from the open position of spill valve 76 towards its closed position, and then amplitude of first control current 210 is reduced. At a time $t_2$ pumping control unit 90 commands closing of second spill valve 78 by supplying second control current 220 to electrical actuator 83. With second spill valve 78 now closed, and first spill valve 76 still closed, spill valve assembly 74 is in the start-of-pressurization configuration. At a time $t_3$, pumping control unit 90 commands opening of first spill valve 76 while second spill valve 78 remains closed. With one of spill valves 76 and 78 now open, namely, first spill valve 76, spill valve assembly 74 is in the start of spill configuration. At a time $t_4$ second control current 220 ceases. An effective pumping duration is shown between a dashed line 230 and a dashed line 240. By closing first spill valve 76 relatively early, it will be appreciated that first spill valve 76 has time to settle to its closed position, and then can respond relatively rapidly and precisely when commanded to open. In a single spill valve design where a single control current is used, challenges relating to accuracy and precision were observed as discussed herein. It will also be appreciated in view of FIG. 4, for example, that effective pumping duration between lines 230 and 240 is determined based on a timing of commanded closing of second spill valve 78 and a timing of commanded opening of first spill valve 76. It will therefore also be appreciated that by varying a timing of the commanded closing of second spill valve 78, in other words varying a timing of time $t_2$, or varying a timing of commanded opening of first spill valve 76, in other words a timing of $t_3$, an effective pumping duration of fuel pump 46 can be adjusted. It will be recalled that in a dual fuel application, challenges can be observed when attempting to controllably deliver very small amounts of liquid fuel into a cylinder. It will also be recalled that gaseous fuel admission valve 32 can admit a metered amount of gaseous fuel, with an amount of liquid fuel that is injected being based on a desired substitution rate of gaseous fuel for liquid fuel. Accordingly, pumping control unit 90 can vary effective pumping duration and thus injection amount, by varying the commanded opening or closing timings, or both, as discussed herein based on a metered amount of gaseous fuel that is delivered.

Figure 6:
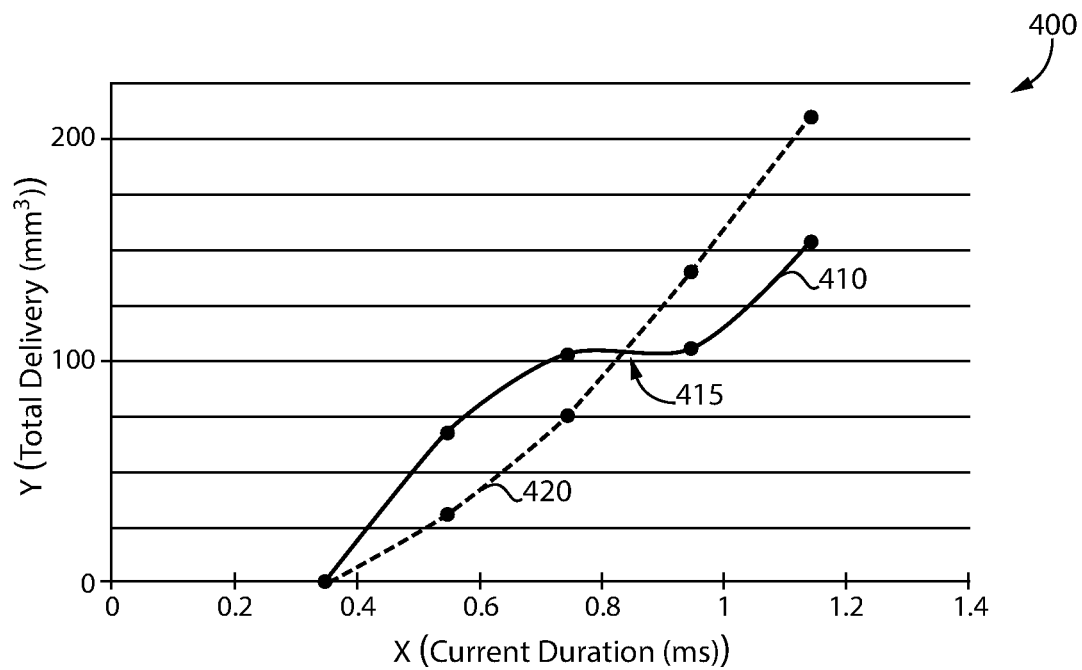
FIG. 6 is graph of current duration versus fuel delivery, comparing a known technique with an embodiment of the present disclosure.

Referring to FIG. 6, there is shown a graph 400 illustrating current duration on the X-axis and total liquid fuel delivery on the Y-axis. A first curve 410 illustrates an example pattern of fuel delivery that might be observed with varying current duration in a single spill valve, of conventional design. It can be seen that a region or section of curve 410, shown generally at reference numeral 415, is relatively flat, meaning that varying control current duration might provide little, if any, change, in fuel delivery. Region 415 illustrates an example scenario where precisely controlling a fuel injection amount in a single spill valve system might be suboptimal. A curve 420 illustrates a pattern of total delivery versus current duration that might be observed where a dual spill valve system as discussed herein is used, and showing a more regular and more linear relationship between current duration and fuel delivery.

INDUSTRIAL APPLICABILITY

Figure 5:
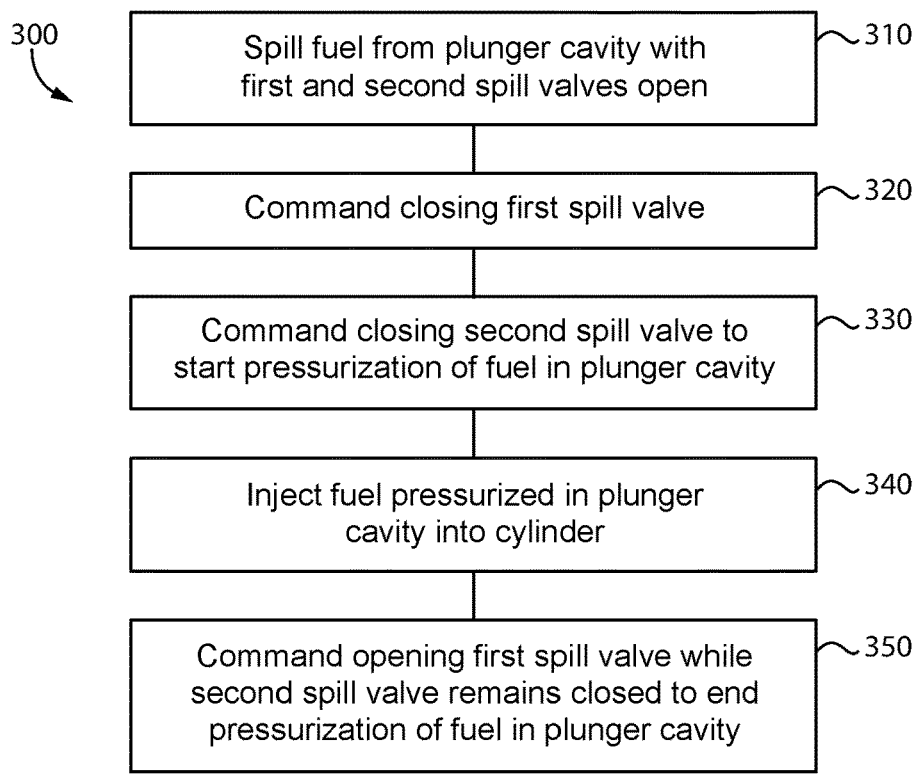
FIG. 5 is a flowchart illustrating example process and control logic flow, according to one embodiment.

Referring to the drawings generally, but also now to FIG. 5 there is shown a flowchart 300 illustrating example process and logic flow according to the present disclosure. At a block 310, fuel is spilled from plunger cavity 58 to low pressure space 54 with first and second spill valves 76 and 78 open. From block 310, flowchart 300 advances to a block 320 to command closing of first spill valve 76. From block 320, flowchart advances to a block 330 to command closing second spill valve 78 to start pressurization of fuel in plunger cavity 58. From block 330, flowchart 300 advances to a block 340 to inject fuel pressurized in plunger cavity 58 into cylinder 18. From block 340, flowchart 300 advances to a block 350 to command opening first spill valve 76 while second spill valve 78 remains closed, to end pressurization of fuel in plunger cavity 58, and again spill fuel to low pressure space 54. Second spill valve 78 could then be opened in anticipation. For relatively larger volumes of fuel passed through spill valve assembly 74, a staggered pattern of operation such as that depicted in FIG. 4 may not be needed as the individual valves may be more precisely and reliably operated. In some instances it could be desirable, however, to stagger control currents at these higher volumes such that control currents do not coincide, for example, to avoid overtaxing a control module or producing other negative electrical consequences.

In an implementation metering an output of a high pressure pump for a common rail, a generally analogous strategy could be adopted where a first spill valve such as spill valve 176 is closed, and then second spill valve 178 closed, with first spill valve 176 then being opened to start spill and end pressurization. Rather than an injection amount motivating spilling versus pumping duration, where metering an output of a fuel pump pressurizing fuel for a common rail, a pressure of the common rail as indicated by a pressure sensor could be used as the basis for pumping duration as it is often desirable to maintain a common rail or other common pressurized fuel reservoir in a relatively narrow pressure range at any given operating period.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where Only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel system for an internal combustion engine comprising:
   a fuel injection nozzle;
   a fuel pump including a plunger coupled to a tappet and structured to pressurize a fuel for injection into the internal combustion engine through the fuel injection nozzle, the fuel pump defining a low pressure space, a high pressure outlet, and a plunger cavity receiving the plunger and fluidly connected to the high pressure outlet;
   a spill valve assembly including a first spill valve and a second spill valve fluidly in parallel with one another between the plunger cavity and the low pressure space, and each of the first spill valve and the second spill valve being movable between an open position where the plunger cavity is fluidly connected to the low pressure space, and a closed position;
   a pumping control unit in control communication with the first spill valve and the second spill valve, the pumping control unit being structured to:
      command closing of the first spill valve;
      command closing of the second spill valve after the closing of the first spill valve to adjust the spill valve assembly to a start-of-pressurization configuration;
      command opening of the first spill valve while the second spill valve remains closed to adjust the spill valve assembly from the start-of-pressurization configuration to a start of spill configuration; and
      determine a pumping duration of the fuel pump based on a timing of the commanded closing of the second spill valve and a timing of the commanded opening of the first spill valve.

2. The fuel system of claim 1 wherein the pumping control unit is further structured to:
   command the closing of the first spill valve by supplying a first control current to a first electrical actuator coupled with the first spill valve; and
   command the closing of the second spill valve by supplying a second control current to a second electrical actuator coupled with the second spill valve, and wherein the first control current and the second control current are overlapping in time but not coincident.

3. The fuel system of claim 1 further comprising a gaseous fuel supply, and a gaseous fuel admission valve structured to admit a metered amount of a gaseous fuel for combustion in the internal combustion engine.

4. The fuel system of claim 3 wherein the pumping control unit is further structured to vary the pumping duration of the fuel pump based on the metered amount of the gaseous fuel.

5. The fuel system of claim 1 wherein the spill valve assembly meters an output of the fuel pump to a pressurized fuel reservoir.

6. The fuel system of claim 5 wherein the pressurized fuel reservoir is located fluidly between the fuel pump and the fuel injection nozzle.

7. The fuel system of claim 6 wherein the fuel injection nozzle includes a direct operated nozzle check, and is one of a plurality of fuel injection nozzles each fluidly connected to the pressurized fuel reservoir.

8. The fuel system of claim 1 wherein the fuel pump further defines a low pressure inlet, and the first spill valve and the second spill valve are arranged fluidly in parallel with one another between the plunger cavity and the low pressure inlet.

9. The fuel system of claim 8 wherein the fuel injection nozzle includes a direct operated nozzle check, and a high pressure nozzle supply passage directly fluidly connected to the high pressure outlet of the fuel pump.

10. A fuel system for an internal combustion engine comprising:
    a fuel supply;
    a plurality of fuel injection nozzles;
    a cam;
    a fuel pump including a plunger coupled to a tappet in contact with the cam and structured to pressurize a fuel for injection into the internal combustion engine through at least one of the plurality of fuel injection nozzles, the fuel pump defining a low pressure space, a high pressure outlet, and a plunger cavity receiving the plunger and fluidly connected to the high pressure outlet;
    a spill valve assembly including a first spill valve and a second spill valve arranged fluidly in parallel with one another between the plunger cavity and the low pressure space; and
    the spill valve assembly having a first configuration where each of the first spill valve and the second spill valve is open, and being adjustable to a start-of-pressurization configuration where each of the first spill valve and the second spill valve is closed, and to a start of spill configuration where the first spill valve is open and the second spill valve remains closed.

11. The fuel system of claim 10 wherein the spill valve assembly meters an output of the fuel pump.

12. The fuel system of claim 11 further comprising a pressurized fuel reservoir fluidly connected to the high pressure outlet and located fluidly between the fuel pump and the plurality of fuel injection nozzles.

13. The fuel system of claim 10 wherein the spill valve assembly further defines a low pressure inlet, and the first spill valve and the second spill valve are arranged fluidly in parallel with one another between the low pressure inlet and the plunger cavity.

14. The fuel system of claim 12 wherein one of the plurality of fuel injection nozzles includes a direct operated nozzle check, and a high pressure nozzle supply passage directly fluidly connected to the high pressure outlet of the fuel pump.

15. The fuel system of claim 13 wherein the fuel pump and one of the plurality of fuel injection nozzles are resident in a fuel injector.

16. The fuel system of claim 13 wherein the fuel supply includes a liquid fuel supply, and further comprising a gaseous fuel supply and a gaseous fuel admission valve.

17. A method of operating a fuel system for an internal combustion engine comprising:
    spilling fuel from a plunger cavity in a fuel pump through each of a first spill valve and a second spill valve in a spill valve assembly to a low pressure space, during moving a plunger in the fuel pump between a retracted position and an advanced position;
    closing the first spill valve in the spill valve assembly;

closing a second spill valve in the spill valve assembly after the closing of the first spill valve to start pressurization of fuel within the plunger cavity;

conveying pressurized fuel from the plunger cavity to a high pressure outlet of the fuel pump;

opening the first spill valve while the second spill valve remains closed to end pressurization of fuel within the plunger cavity at a timing determining a pumping duration of the fuel pump; and feeding the pressurized fuel from the high pressure passage to a nozzle supply passage in a fuel injection nozzle.

18. The method of claim 17 wherein:

the closing of the first spill valve includes closing the first spill valve in response to supplying a first electrical current to a first electrical actuator;

the closing of the second spill valve includes closing the second spill valve in response to supplying a second electrical current to a second electrical actuator; and the first electrical current and the second electrical current are overlapping in time but not coincident.

19. The method of claim 17 further comprising varying the pumping duration of the fuel pump at least in part by varying a time between the closing of the first spill valve and at least one of the closing of the second spill valve or the opening of the first spill valve.

20. The method of claim 19 further comprising:

injecting the pressurized fuel fed to the nozzle supply passage into a cylinder in the internal combustion engine in an injection amount that is based on the pumping duration of the fuel pump; and combusting the injected pressurized fuel with a mixture of air and gaseous fuel in the cylinder.

\* \* \* \* \*